Patented June 11, 1929.

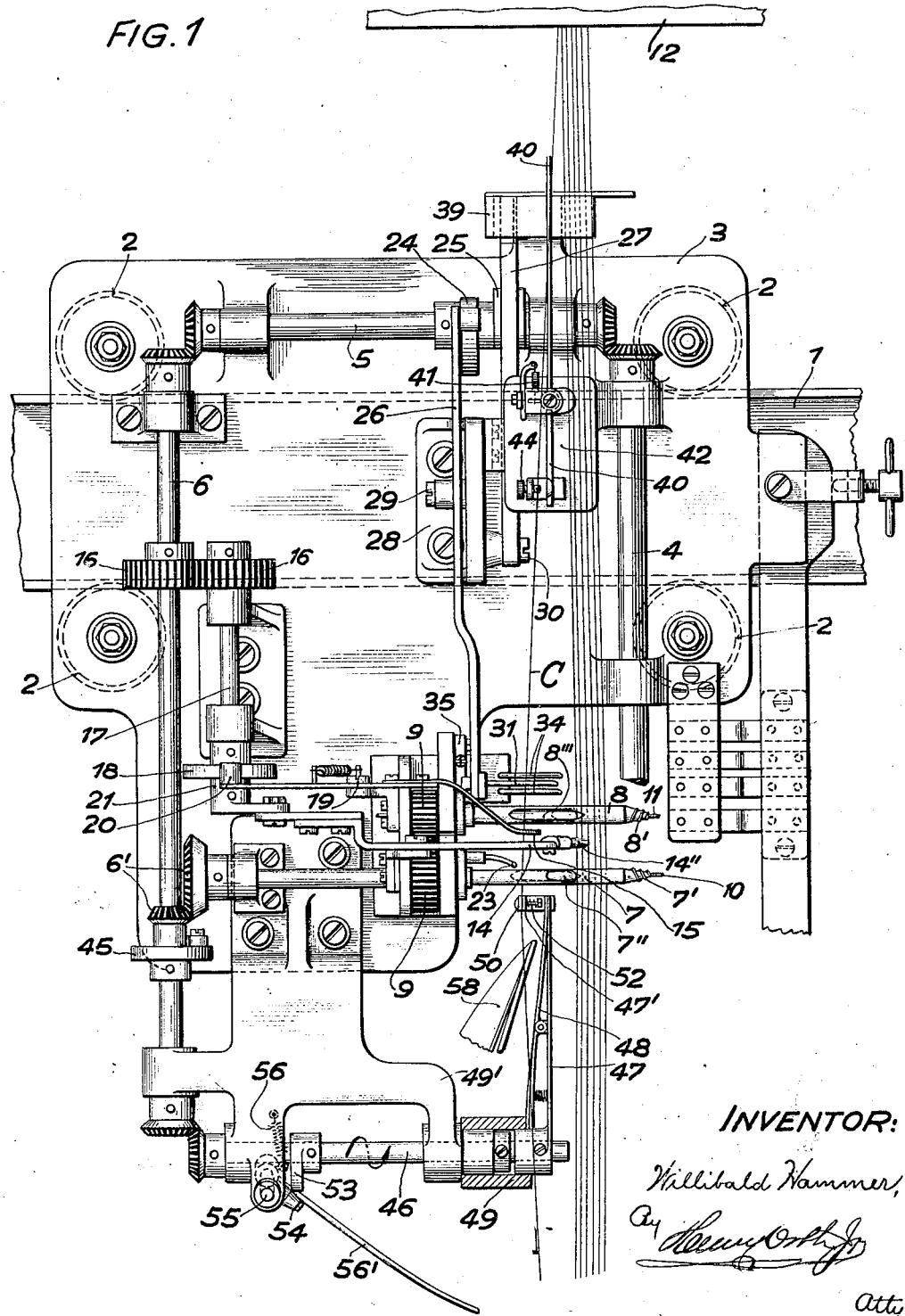

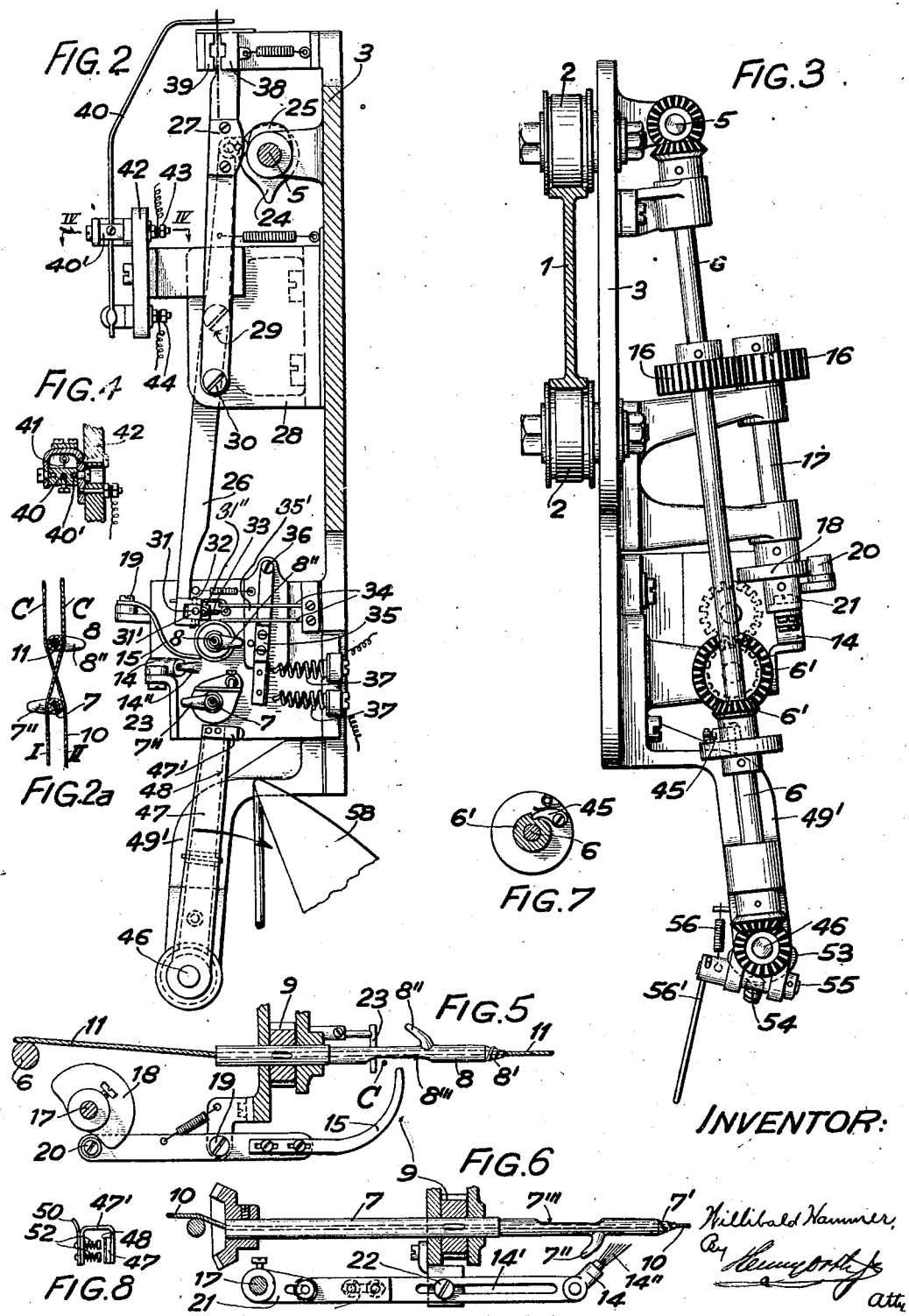

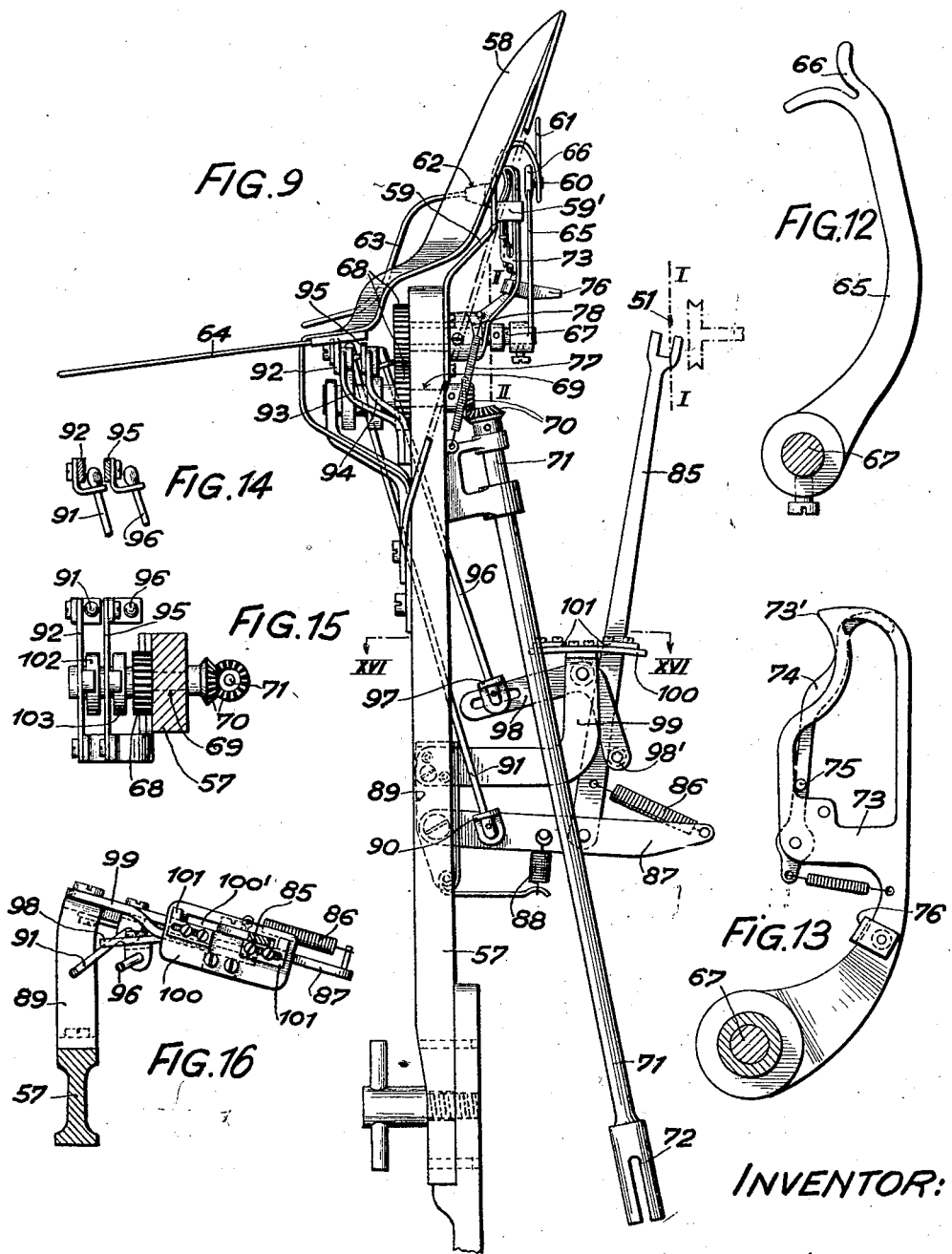

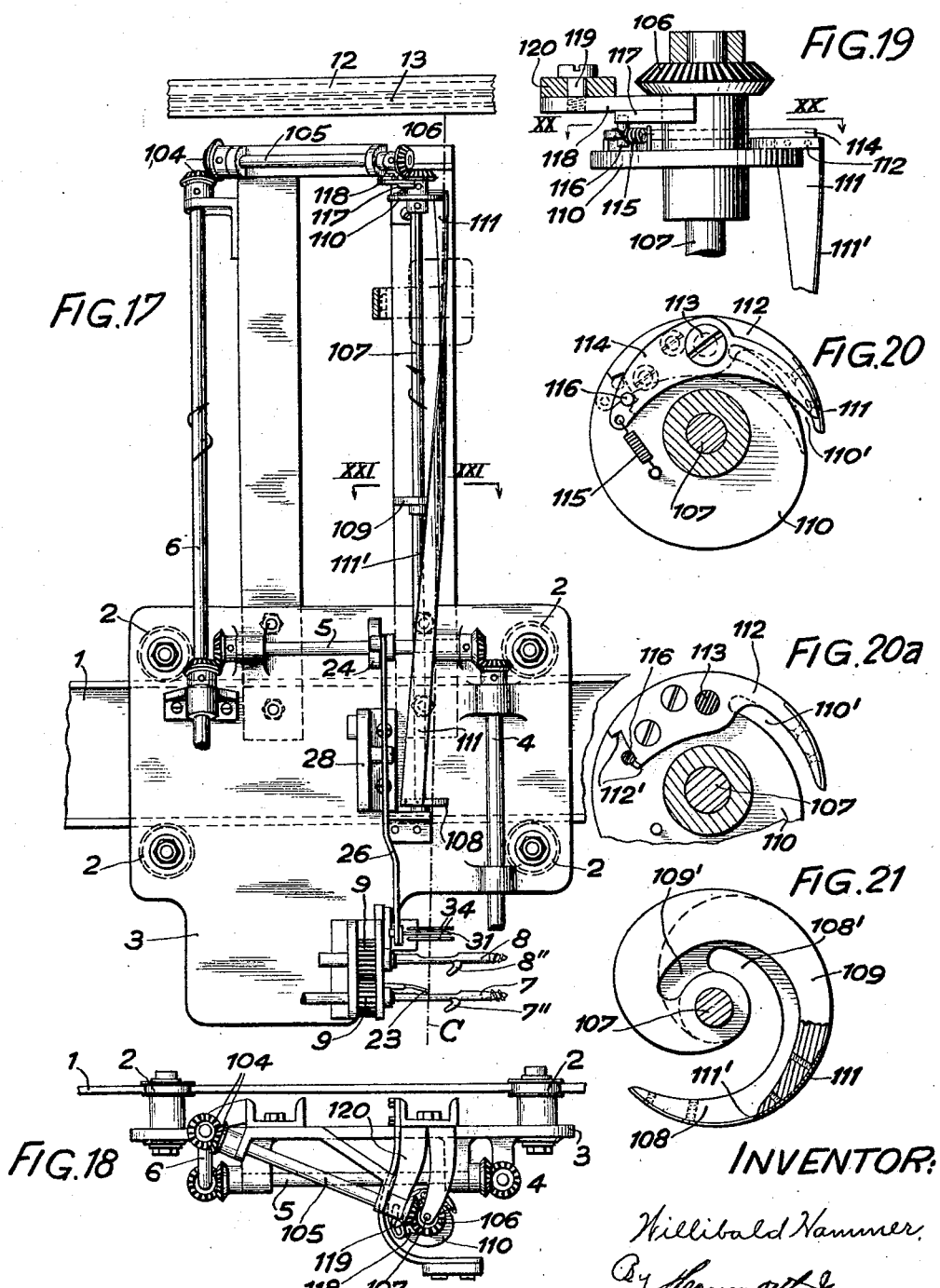

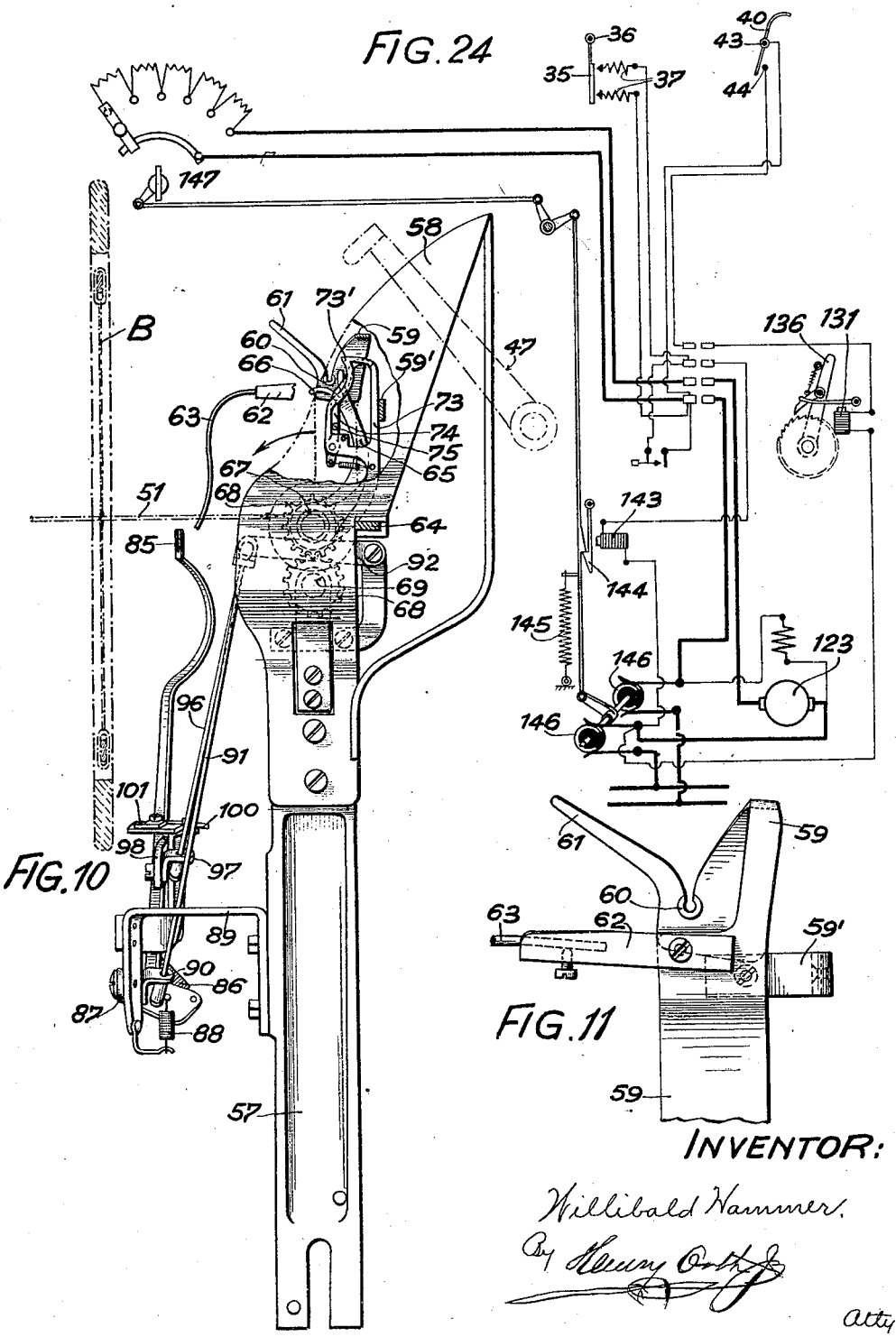

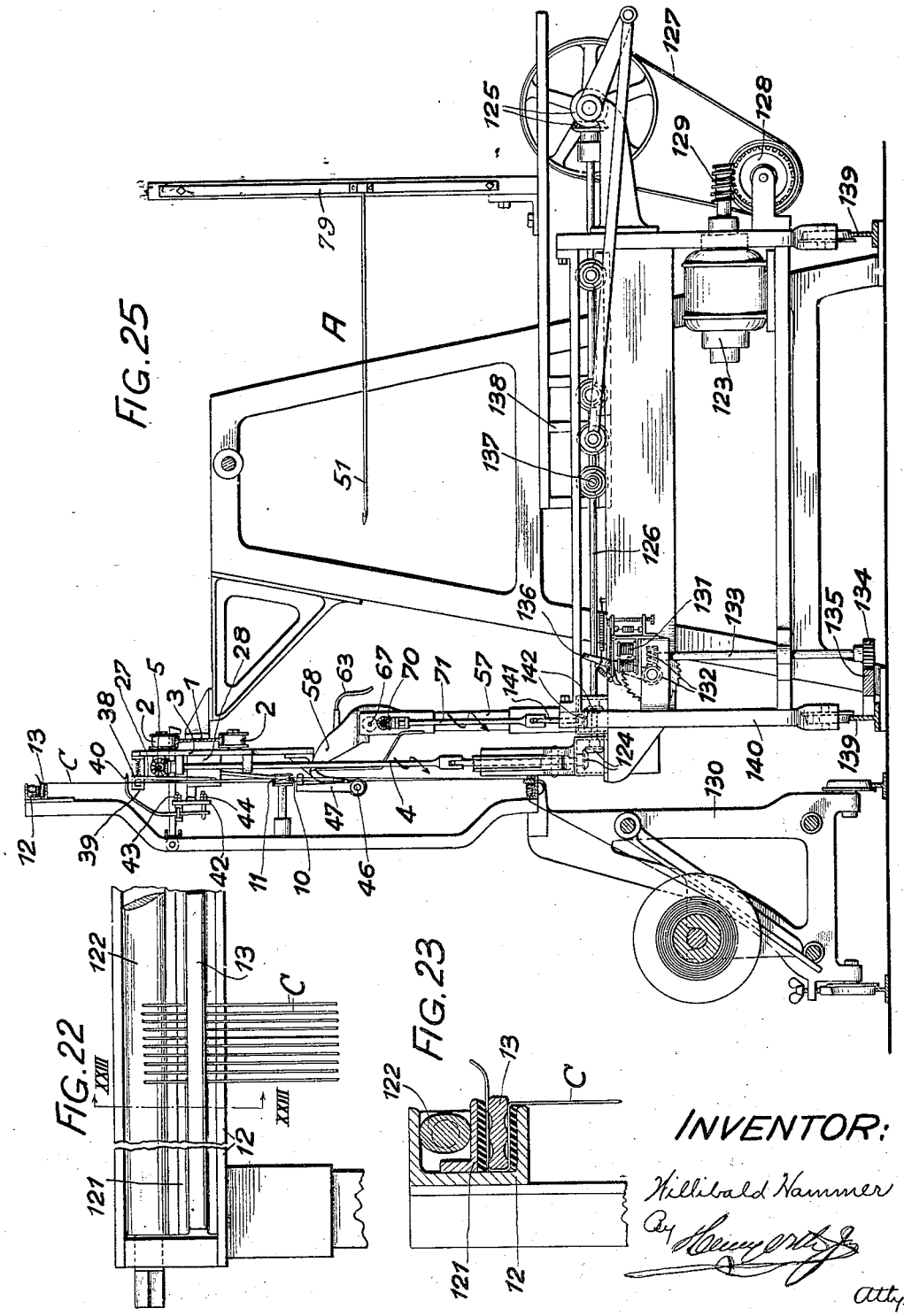

1,716,549

UNITED STATES PATENT OFFICE.

WILLIBALD HAMMER, OF USTER, SWITZERLAND, ASSIGNOR TO THE FIRM ZELLWEGER A. G., OF USTER, SWITZERLAND.

DEVICE FOR SEPARATING AND SUPPLYING THREADS PARTICULARLY TO WARP-HEDDLING MACHINES.

Application filed February 9, 1928, Serial No. 253,120, and in Germany January 21, 1927.

The present invention relates to improvements in devices for separating and supplying threads particularly to warp-heddling machines.

The difficulties inherent to a reliable separation and supply of the single threads increase the quicker the separation from a row of threads has to be performed.

In order to increase the output with the device according to the present invention a thread remover arranged between two rotating thread separating spindles and moved within the range of the row of threads cooperates with these two spindles in such a manner that it transports one thread after the other to the rear of stop members for the row of threads provided on the spindles in order to present the threads singly one after the other to a thread feeder.

This device is particularly suitable as an auxiliary arrangement to warp-heddling machines, but it may be used wherever the separation and the transporting of single threads of a row of threads is contemplated.

A constructional example of a device according to the present invention which may for instance be used in combination with the warp-heddling machine forming the subject matter of my United States Patent No. 1,645,988, filed July 20, 1925, is illustrated on the accompanying drawings, in which Fig. 1 shows in elevation the thread separating device proper, Figs. 2 and 3 are side elevations of Fig. 1 seen from the left and right hand side respectively, Fig. 2ª serves for explaining a detail, Fig. 4 is a horizontal section along line IV—IV in Fig. 2, Figs. 5, 6, 7 and 8 show details (Figs. 5 and 6 on a larger scale), Fig. 9 shows in elevation the thread laying apparatus, Fig. 10 is a side view of Fig. 9, Figs. 11, 12, 13, 14 and 15 show details (Figs. 11, 12 and 13 on a larger scale) of the apparatus illustrated in Figs. 9 and 10, Fig. 16 is a section along line XVI—XVI in Fig. 9, Fig. 17 shows in elevation the modification in which the separating device is combined with a device for cutting the separated warp threads, Fig. 18 is a plan view of Fig. 17, Fig. 19 shows on a larger scale a detail of the cutting device, Fig. 20 is a section along line XX—XX in Fig. 19 and Fig. 20ª is a detail of Fig. 20, Fig. 21 is a section along line XXI—XXI in Fig. 17 and drawn to the same scale as Figs. 18 and 19.

Fig. 22 shows in elevation part of a clamping device,

Fig. 23 is a vertical section along line XXIII—XXIII in Fig. 22,

Fig. 24 is a diagram of the electric connections,

Fig. 25 is a side elevation of the device for separating the threads in cooperation with the heddling machine.

Figure 26:
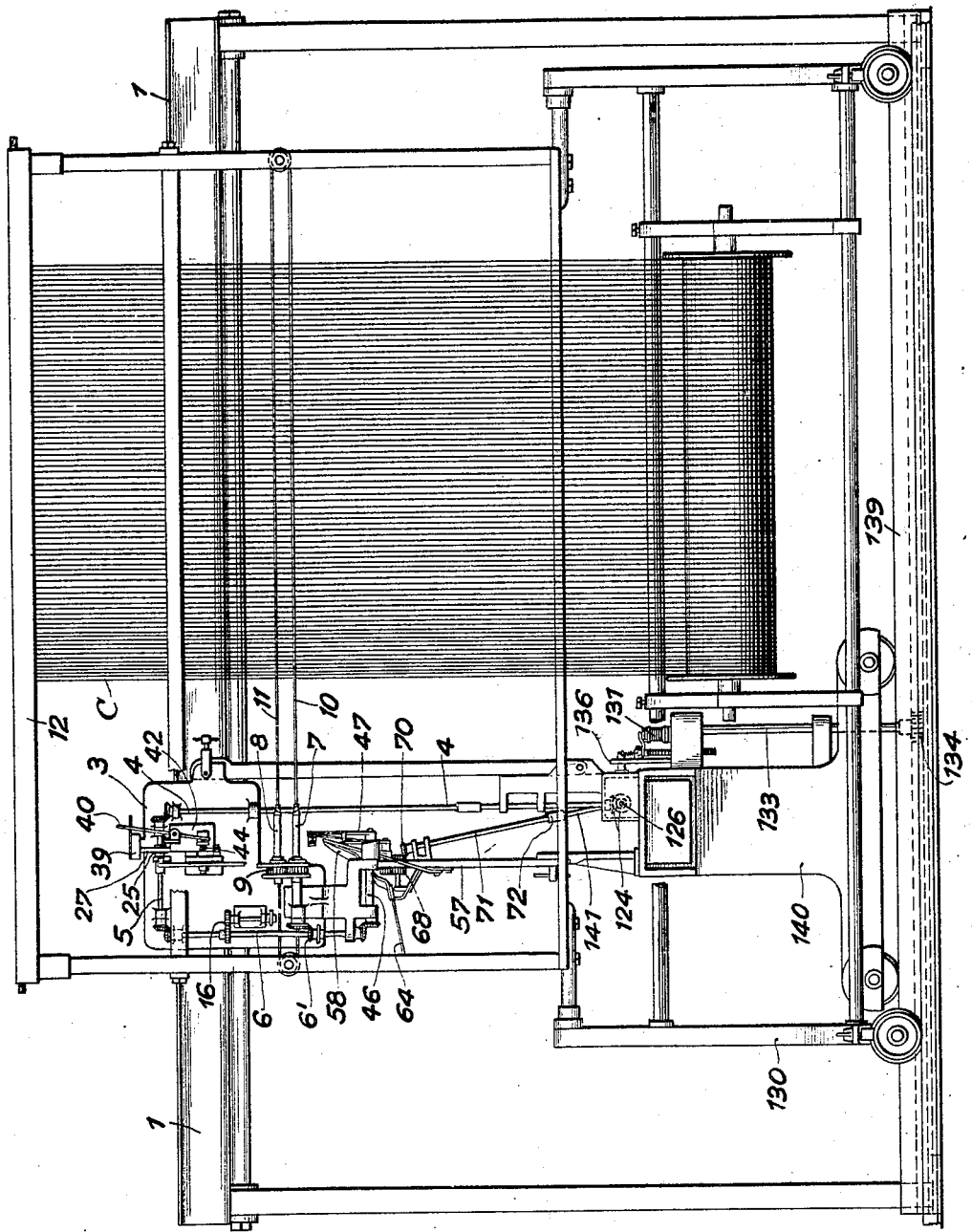
Fig. 26 is a front elevation of Fig. 25.

Referring now to the drawings 1 denotes a rail along which a vertical base plate 3 carrying the thread separating device is displaceable by means of rollers 2 (Figs. 1, 3). 4 is a vertical driving shaft mounted on the plate 3 and transmitting its rotary movement to a horizontal shaft 5 and by the latter to an oblique shaft 6. The latter drives by the intermediary of bevel wheels 6' a thread separating spindle 7 with which a second thread separating spindle 8 is in positive driving connection by the pair of spur gear wheels 9. The working spindles 7, 8, which rotate in opposite directions, have conical free ends provided with a right hand and left hand thread 7', 8' respectively, so that they tend to work themselves in between the threads of the group of warp threads arranged in front of them and to move the threads in regular order towards the left in Fig. 1 into the position shown in Fig. 1. The spindles 7 and 8 are provided on their shafts with a beak 7" and 8" respectively and with a flattened portion 7''' and 8''' respectively (Figs. 6, 5) the spindles 7 and 8 are provided with a central bore through which the portions 10 and 11 of a string respectively pass, the complete string is shown in Fig. 26.

The string portions 10 and 11 serve for separating the warp threads to be heddled into two groups I and II which cross each other between the spindles 7, 8 (see Fig. 2ª) and of the warp threads C arranged in the row one belongs to one group of threads and the adjacent to the other group of threads and so on. The one end of the warp threads C (to be heddled) are clamped between a rail 12 (Fig. 17) arranged above the plate 3 and carried by the warp carriage.

A detail of this clamping device is shown in Figs. 22 and 23, in which the rail 12 consists of a channel in which an angle iron 121 is displaceably mounted. The horizontal flange 121 of the angle iron cooperates with the lower flange of the channel iron 12 and a bar 13 for clamping the inserted warp threads. A bar 122 having an ovoid cross-section is turnable and serves for pressing the angle iron 121 against the lower flange of the channel iron 12 for effecting the clamping.

Between the lower separating spindle 7 and the upper separating spindle 8 a thread remover 14 and a stop 15 for the single thread separated from the row of warp threads are provided. Motion is imparted to the thread remover 14 and to the stop 15 by a shaft 17 operatively connected by a pair of spur gear wheels 16 with the shaft 6. The shaft 17 is provided with a cam disc 18 with which a roller 20 provided on the stop 15, which is turnable about a pin 19, cooperates (Fig. 5). A crank 21 fixed to the shaft 17 causes the movement of the remover 14 which is guided in a longitudinal slot 14' of a stationary bolt 22 (Fig. 6) and which is provided at its free end with a bunch of bristles 14'' carrying out a movement along an elliptical path.

From the warp threads C moved on the separating spindles 7, 8 one thread after the other is separated by the member 14 as the bunch of bristles 14'' engages during its movement the foremost thread which is released to be displaced by a corresponding turning motion of the beaks 7'' or 8'' respectively. The next thread in the row is held back by the beaks of both separating spindles. As is shown in Fig. 1 the member 14 has just moved a warp thread C, which is guided by passing behind the spindle 7 and in front of the spindle 8, towards the left so that it is placed between a stationary stop 23 and the movable stop 15. During the displacement of the thread from the row into the position beyond the beaks 7'' 8'' of the spindles 7, 8 the movable stop 15 controlled by the cam 18 is held out of the path of this displacement movement of the thread, but is thereafter turned in the inward direction towards the displaced thread, so that the latter is caught between the two stops 23 and 15; eventually the movable stop 15 moves the single thread into its right position if it has not been previously displaced far enough in the lateral direction by the bristles 14''. The plate 3 carries out a step by step movement along the rail 1 towards the right when looking at Fig. 1, i. e. in the direction of the row of warp threads to be treated, as will be explained later on.

On the horizontal shaft 5 two cam discs 24, 25 (Figs. 1 and 2) are present which control two spring loaded levers 26, 27. The latter are fulcrumed in pins 29, 30 mounted on a bracket 28 fixed to the plate 3.

The two-armed lever 26 carries at the free end of its downwardly directed arm a laterally projecting feeler arm 31 swingable about an axle 32 (Fig. 2) disposed transverse to the arm. A tension spring 33 tends to keep the feeler arm 31 in its position of rest in which the head 31' rests on the bearing provided for it on the lever 26. The two-armed lever 26 swings to and fro and periodically moves the feeler arm 31 into a position between two stationary stops 34 in the path of which is the warp thread C situated between the stops 23 and 15. The feeler arm 31 hits against the warp thread C, which is held in position by the stops 34, whereupon the feeler arm 31 is turned against the action of the spring 33 on the lever 26 when the latter continues its inward movement. If, however, an interruption in the proper movement of the threads has occurred, so that no thread has been moved into the position between the stops 25, and 15, the feeler lever 31 does not encounter any resistance during the inward movement of the lever 26. Consequently the feeler arm 31 remains in its position of rest on the lever 26 and an extension 31'' provided on the head 31' of the feeler lever knocks against an extension 35' of a spring loaded contact lever 35. The latter, which is mounted on a pin 36, is so turned against the influence of its spring, that it causes the contact of two contact springs 37 whereby an electric motor 123 (Fig. 25) driving the warp-heddling machine is cut out and this machine is stopped.

The contact between the parts 35 and 37 causes a circuit to be closed which energizes an electromagnet 143 (Fig. 24). Thereby the armature 144 is attracted and the spring 145 is released to close the main switch 146 of the electric motor 123. By turning the knob 147 the main switch 146 is cut in again, whereupon the armature 144 returns into its locking position. The shaft 4 of the separating device is coupled to the electric motor 123 by means of bevel wheels 124 and 125, a shaft 126 belt drive 127 and worm wheel 128 and worm 129.

The lever 27, which is controlled by the cam disc 25, carries at its free end a jaw 38 which is opposite to a stationary jaw 39. By means of the lever 27 the jaw 38 is periodically moved against the jaw 39 for the purpose of clamping the warp threads placed between the jaws 38, 39 by the step by step movement of the plate 3, to prevent these warp threads from being pulled out of the clamping device (12, 13 Fig. 17) provided on the warp carriage 130 (Fig. 25), when the member 14 contacts with the foremost thread of the row of threads and displaces it along the separating spindles 7, 8; the clamping device 12, 13 on the warp carriage is situated above the jaws 38, 39 (Fig. 25).

A stop constructed as feeler lever 40 (Figs. 1, 2) cooperates with the row of threads entering between the jaws 38, 39 and, by the threads, is held turned out of its position of rest against the influence of a tension spring 41 (Figs. 1, 4). The spring 41 cooperates with the head 40' of the feeler lever 40, which, by means of this head is mounted in a bracket 42 in an axle transversely disposed to the row of warp threads. Two binding screws 43, 44 are provided on the bracket 42. If owing to the completed heddling of a number of threads, which have previously been pulled out of the clamping device, 12, 13 (Fig. 17) of the warp carriage, the feeler lever 40 is no longer kept sufficiently angularly displaced against the influence of its spring 41, the feeler lever 40 contacts with the binding screw 44. Thereby an electric circuit of an electro-magnetic ratchet device 131 (Fig. 25) is closed causing the plate 3 to be displaced by one step in the direction towards the row of threads to be treated by the intermediary of screw wheels 132, shaft 133, pinion 134 and toothed rack 135, the lever 136 of the ratchet device being acted upon by the axle pin 137 of the carriage 138 of the warp heddling machine. This displacement movement of the plate 3 by the displacement of the heddling machine along the track 139 is interrupted as soon as the feeler lever 40 has again been angularly displaced by the approaching row of threads so far that it is moved out of the contact at 44, whereby the circuit of the above mentioned electromagnetic ratchet device is interrupted and so on. The displacement movement of the plate 3 occurs thus automatically and in accordance with the separating and heddling of the threads.

The drive of the spindles 7, 8 for separating the threads is only effected when the driving shaft 4 rotates in one direction, a uni-directional clutch 45 (see also Fig. 7) being provided on the shaft 6 and turning the bevel wheel 6' loosely mounted on the shaft 6. Owing to the interposition of this clutch 45 into the drive of the separating spindles 7 and 8 it is rendered possible to turn the spindles 7 and 8 manually in the opposite direction to that in which they are mechanically driven, for adjusting the spindles and the row of warp threads on the spindles before the device starts to work.

The shaft 6 drives further a lower horizontal shaft 46 turnably mounted in the plate 3 and on which a feeder 47 for the thread is fixed. The feeder 47 is provided with a spring loaded two-armed lever 48, which by means of its one arm cooperates with the adjacent end facing of a sleeve 49 on which a cam facing is provided, the sleeve 49 resting against the bracket 49' in which the shaft 46 is mounted. The second arm of the lever 48, rocked by the cam facing on the sleeve 49, is adapted to so displace a small plate 50 against the action of two compression springs pushed over pins 52 that the plate 50 (see also Fig. 8) is distanced from a stirrup shaped member 47' fixed to the feeder 47. The two pins 52 arranged in one plane carry the small plate 50. As may be seen in Fig. 1 the plate 50 abuts against the free arm of the member 47' whereby between this arm and the plate 50 the warp thread C inserted between the stops 23 and 15 is clamped. During its circular movement the feeder 47 reaches the warp thread C, which has been moved by the member 14 into the position between the stops 23 and 15, with its plate 50 moved away from the stirrup 47' by the lever 48, i. e. with the opened clamping device 50, 47', thereby, if necessary the thread is moved into the intermediate space between the parts 50 and 47' by the latter, in which intermediate space the thread, which has ultimately to be laid on the threading needle 51 (Fig. 10), rests against that of the pins 52 carrying the small plate 50 which is in front with respect to the turning movement of the feeder 47 (see arrow indicated in Fig. 2). The lever 48 swings thereupon so that the springs of the pins 52 pull the small plate 50 towards the free arm of the stirrup member 47' so that only the thread is clamped between the parts 50 and 47'. Upon the further turning of the feeder 47 the lever 48, the movements of which are controlled by the sleeve 49, moves the plate 50 away from the member 47' for releasing the clamped thread.

On the shaft 46 a further cam body 53 is fixed cooperating with a roller on an arm 54. The latter is fulcrumed by an axle 55, and acted upon by a tension spring 56, (Figs. 1 and 3), whereby the arm 54 together with its roller is continuously pressed against the cam body 53. The axle 55 carries a canti-levered member 56' (only part of which is shown in the drawings) which is rocked at every revolution of the shaft 46 for the purpose of moving the end of the thread displaced by the feeder 47, and which is remote to the end which has to be threaded, out of the working range.

On the carriage 140 of the heddling machine a support 57 (Figs. 9, 10 and 25) is fixed, which carries at its top a guide member 58. Within the path of movement of this guide member 58, which serves for guiding the single separated thread to be moved further on, an eyelet 60 is provided on a sheet metal part 59 from which the extension 61 starts. The part 59 is further provided with a stirrup 59' and carries on a holder 62 an arm 63 for deviating the thread. 64 denotes an arm for deviating the thread and is fixed to the lower part of the guide member 58. Between the latter and the eyelet 60 an organ 65 for laying the thread in position moves on a circular path, which organ has a fork-shaped free end 66 for holding the thread. The organ 65 is fixed on a shaft 67 mounted in the support 57 and driven by a pair of gear wheels 68, the second gear wheel of which is fixed to a shaft 69 also rotatably mounted in the support 57. The shaft 69 is driven by means of a bevel wheel drive 70 from a shaft 71 coupled with a shaft 141 (Fig. 25) and driven from the electric motor 123 by the intermediary of shaft 126 and bevel wheels 142. Besides the organ 65 a lever 73 is arranged on the shaft 67, which carries at its side a spring loaded auxiliary lever 74, which under the action of its spring 77 normally abuts against the lever 73 by means of a pin 75 projecting through a recess of the lever 73, whereby the auxiliary lever 74 projects beyond a curved recess 73' provided on the lever 73. The latter is provided with a stop 76 for the thread laying organ 65. A tension spring 77, which is connected with its other end with the support 57, tends to maintain the lever 73 pressed against the stirrup 59'. The tension spring 77 is obliquely arranged so that it simultaneously influences the lever 73 in an axial direction by holding it against an abutment 78. The latter presents an oblique guide facing to the lever 73 in such a manner that when the lever 73 rocks in the direction indicated by the arrow in Fig. 10 it moves with its free end further away in an axial direction from the thread laying organ 65.

The single thread placed within the separating device between the stops 23 and 15 is caught by the moving feeder 47 and is placed over the guide 58. The feeder 47 moves the thread, which it has pulled out of the clamping device 12, 13 (Fig. 17) of the heddling carriage 130, past the left hand side (in Fig. 1) of the end of the guide 58 into the latter and by the guiding edge of the guide 58 the thread is brought further to the left on its further movement whilst the feeder 47 holds the thread at the right hand side of the guiding edge of 58. The feeder 47 moves in Fig. 9 past the right hand side of the extension 61 by means of which the thread is now guided into the eyelet 60 whereupon it is released by the feeder 47 owing to the automatic opening of its clamping device 50, 47'.

During its movement and before it reaches that portion of the thread, inserted between the eyelet, which is between the latter and the guiding edge of the guide 58 the thread laying organ 65 abuts against the stop 76 of the lever 73, which is then caused to take part in the motion of the organ 65 over a certain distance. Thereby the auxiliary lever 74 mounted on the lever 73 contacts with its part projecting beyond the recess 73' of the lever 73 with the portion of the thread to be moved on and situated between that guiding edge of 58 and the eyelet 60; thus the thread is caught in the recess 73' of the lever 73 and enters the fork 66 of the organ 65; the auxiliary lever 74 acts by reason of its spring as an elastic buffer whereby the thread is spared. On account of the oblique guidance of the lever 73 in the axial direction on the abutment 78 the stop 76 of the lever 73 glides off the organ 65 after a certain angular movement so that solely the organ 65 moves the thread further; the lever 73 is thereupon swung back into its normal position by the spring 77, and after a further turning movement of the organ 65 the lever 73 is again turned for the purpose of moving further on a thread newly presented in the mean time from the separating device by the feeder 47.

The thread laying organ 65 places the thread which has been drawn out in the manner of a loop between the eyelet 60 and the member 58, on the threading needle 51, which in the mean time has been moved from the position I indicated in Fig. 9 by a horizontal displacement into the position indicated by the line II, so that the thread laying organ 65 passes on the right hand side (in Fig. 9) of the threading needle 51. The latter together with its supporting device 79 is thereupon withdrawn in the direction indicated by the arrow in Fig. 10, whereby the thread caught by the hook of the needle is threaded through the heddle B, through the eye of which the needle 51 has been pushed during the displacement from the initial position into the position I (previous to the lateral displacement from I to II) as is indicated in dash and dot lines in Fig. 10. The heddle B has previously been separated from a group of heddles in the heddle separating apparatus A, which group of heddles belongs to one of the harnesses arranged one behind the other and which has been taken from the respective row of heddles (harness) by the separating apparatus as described in my earlier U. S. patent referred to above.

During its lateral displacement from the position I into II the needle 51 is guided with its front part in the fork shaped free end of the lever 85, which is influenced by a tension spring 86 and carried by a lever 87 which in its turn is acted upon by a tension spring 88. The carrying lever 87 is mounted on a stirrup 89 fixed to the support 57 and comprises an angular part 90 with which a controlling rod 91 cooperates, the latter being connected with its other end with a lever 92 (Figs. 14 and 15) mounted on a bracket 93 fixed to the support 57. In a second bracket 94 on the support 57 a lever 95 is mounted with which a rod 96 cooperates connected with its other end to an angular piece 97 that is adjustable along a slot of a bell-crank lever 98. The latter is mounted in a supporting part 99 fixed to the stirrup 89 and the part 99 is provided with a plate 100 having a guide slot 100' through which the lever 85 passes. Two adjustable stops 101 provided on the plate 100 permit an adjustment of the length of the guidance in the slot 100' for the lever 85. The bell crank lever 98 carries a roller 98' against which the guide lever 85 is pressed by the action of the spring 86. The levers 92 and 95 connected to the rods 91 and 96 cooperate by means of rollers with cam discs 102, 103, fixed to the shaft 69 which carries one wheel of the bevel wheel drive 70.

Previous to the lateral displacement of the threading needle 51 from the position I into the position II the rod 91 acted upon by the cam 102 causes an upward swinging motion of the supporting lever 87, so that the guide lever 85 is pushed in the upward direction in the plate 100 and receives the needle 51 in its fork. Thereupon the guide lever 85 is turned, by the influence of the cam disc 103, rod 96 and bell crank lever 98, about its pivot mounted in the supporting lever 87, whereby the needle 51 carries out its lateral displacement movement by the guide lever 85 moving in the appropriate direction in the slot 100' of the plate 100. Later on the guide lever 85 is moved in the downward direction by means of the supporting lever 87 to release the threading needle 51. Thereupon by an appropriate swinging motion of the bell crank lever 98 the guide lever 85 is swung back into its initial position shown in Fig. 9 by a turning motion about its axle provided on the supporting lever 87 caused by the spring 86, in order to be able to receive again the needle moved forward for a further threading action.

In the modified constructional example of the machine illustrated in Figs. 17–21 a shaft 105 is driven by means of a bevel drive 104, from the shaft 6 of the thread separating device, which oblique shaft 6 has been lengthened to that end. The shaft 105 transmits its turning motion by a bevel gear drive 106 to a shaft 107. The latter is provided with three discs 108, 109 and 110, provided with slots 108', 109' and 110' respectively open towards the circumference. The three slots are differently shaped and so arranged that the openings of the slots in the discs 108, 109 and 110 are angularly displaced with regard to the shaft 107, and are connected with each other by means of a helically twisted sheet metal strip 111 whereby a guide drum for the warp thread C separated from the row of threads is formed. The disc 110 is provided with a part 112 for forming the slot 110' (see also Fig. 20ᵃ), with which a cutting lever 114 swingable about a fulcrum pin 113 cooperates, a tension spring 115 acting upon said cutting lever 114. On the latter a stop 116 is provided cooperating with a guide plate 117 on an arm 118. The arm 118 is adjustable by means of a set screw 119 in a slot of a bracket 120 fixed to the plate 3. Clearance is provided between two needles 112' of the part 112 for the stop pin 116 of the cutting lever 114.

The shaft 107 turns in the direction of the arrow shown in Fig. 17 whereby the tensioned thread C separated by the thread remover 14 (Figs. 1, 6) gets by itself into the slot 108' of the lowermost disc 108 of the shaft 107. The longitudinal edge 111' of the guide wall 111 which is in front during the rotation of the shaft 107 guides in time the thread C into the slots 109' and 110' of the middle and upper disc 109 and 110. The cutting lever 114 provided on the upper disc 110 is thereupon in the position shown in chain dotted lines in Fig. 20, in order to swing later on into the position shown in full lines by the influence of the spring 115 when the stop pin 116 has left the guide plate 117, whereby the warp thread C passing through the slot 110' is severed so that its fastening end remains in the clamping device 12, 13. In this manner the tension of the thread required for drawing the thread out of the clamping device is thus avoided, whereby the thread is spared.

The above described arrangement permits a quick working and a reliable separating and displacement of the single threads.

I claim:

1. In a device of the type described, comprising in combination, means to hold the threads to be separated in a row, two rotatable thread separating spindles cooperating with the row of threads, a stop member provided on each thread separating spindle, a thread remover arranged between said two spindles and adapted to transport one thread after the other beyond the stop members on said spindles, and a thread feeder to which every single removed thread is presented.

2. In a device of the type described, comprising in combination, means to hold the threads to be separated in a row, two rotatable hollow thread separating spindles having conical ends provided with screw thread for cooperating with said row of threads, strings passing through said hollow spindles and through said row of threads and adapted to subdivide the latter into two groups whereby adjacent threads in the row belong to different groups, a stop member provided on each thread separating spindle, a thread remover arranged between said two spindles and adapted to transport one thread after the other beyond the stop members on said spindles, and a thread feeder to which every single removed thread is presented.

3. In a device of the type described, comprising in combination, means to hold the threads to be separated in a row, two rotatable thread separating spindles cooperating with said row of threads for moving the latter along the spindles, a stop member provided on every thread separating spindle, a thread remover arranged between said two spindles and provided with a bunch of bristles for sweeping engagement with said threads, means adapted to impart to said thread remover a movement transverse to said threads for transporting one thread after the other beyond the stop members on said spindles and a thread feeder to which every single removed thread is presented.

4. In a device of the type described, comprising in combination, means to hold the threads to be separated in a row, two rotatable hollow thread separating spindles having conical ends provided with screw thread for cooperating with said row of threads, strings passing through said hollow spindles and through said row of threads and adapted to subdivide the latter into two groups whereby adjacent threads in the row belong to different groups, a stop member provided on every thread separating spindle, a thread remover arranged between said two spindles and provided with a bunch of bristles for sweeping engagement with said threads, means adapted to impart to said thread remover a movement transverse to said threads for transporting one thread after the other beyond the stop members on said spindles, and a thread feeder to which every single removed thread is presented.

5. In a device of the type described, comprising in combination, means to hold the threads to be separated in a row, two rotatable thread separating spindles cooperating with said row of threads for moving the latter along the spindles, a stop member provided on every thread separating spindle, a thread remover arranged between said two spindles and provided with a bunch of bristles for sweeping engagement with said threads, means adapted to impart to said thread remover a movement transverse to said threads for transporting one thread after the other beyond the stop members on said spindles a thread feeder to which every single removed thread is presented, a stationary stop and a withdrawable stop between which two stops the thread displaced by the thread remover is caught.

6. In a device of the type described, comprising in combination, means to hold the threads to be separated in a row, two rotatable thread separating spindles cooperating with the row of threads, a stop member provided on each thread separating spindle, a thread remover arranged between said two spindles and adapted to transport one thread after the other beyond the stop members on said spindles, a thread feeder to which every single removed thread is presented, and a thread clamping device provided on said thread feeder and adapted to be automatically opened and closed by the movement of the feeder.

7. In a device of the type described, comprising in combination, means to hold the threads to be separated in a row, two rotatable thread separating spindles cooperating with the row of threads, a stop member provided on each thread separating spindle, a thread remover arranged between said two spindles and adapted to transport one thread after the other beyond the stop members on said spindles, a thread feeder to which every single removed thread is presented, a spring loaded lever mounted on said thread feeder, a cam device cooperating with said spring loaded lever, and a thread clamping device provided on said thread feeder and in operative connection with said spring loaded lever for being opened and closed.

8. In a device of the type described, comprising in combination, means to hold the threads to be separated in a row, two rotatable thread separating spindles cooperating with the row of threads, a stop member provided on each thread separating spindle, a thread remover arranged between said two spindles and adapted to transport one thread after the other beyond the stop members on said spindles, a thread feeder to which every single removed thread is presented, a guide member for acting on the thread displaced by the movement of the feeder, and an eyelet for receiving the thread from said guide member.

9. In a device of the type described, comprising in combination, means to hold the threads to be separated in a row, two rotatable thread separating spindles cooperating with the row of threads, a stop member provided on each thread separating spindle, a thread remover arranged between said two spindles and adapted to transport one thread after the other beyond the stop members on said spindles, a thread feeder to which every single removed thread is presented, a guide member for acting on the thread displaced by the movement of the feeder, an eyelet for receiving the thread from said guide member, a member adapted to lay the thread on a threading needle, said eyelet being in the path of the thread laying member, and a resilient buffer device cooperating with said thread laying member and taking part in part of the movement of the latter.

10. In a device of the type described, comprising in combination, means to hold the threads to be separated in a row, two rotatable threads separating spindles cooperating with the row of threads, a stop member provided on each thread separating spindle, a thread remover arranged between said two spindles and adapted to transport one thread after the other beyond the stop members on said spindles, a thread feeder to which every single removed thread is presented, a guide member for acting on the thread displaced by the movement of the feeder, an eyelet for receiving the thread from said guide member, a member adapted to lay the thread on a threading needle, said eyelet being in the path of the thread laying member, and a resilient buffer device cooperating with said thread laying member and taking part in part of the movement of the latter, said buffer device comprising a supporting lever, and a spring loaded auxiliary lever, carried by the latter and projecting normally beyond a recess provided on the supporting lever and adapted to receive the thread to be transported, the supporting lever with its auxiliary lever returning into their initial position whilst the thread laying member completes its movement.

11. In a device of the type described, comprising in combination, means to hold the threads to be separated in a row, two rotatable thread separating spindles cooperating with the row of threads, a stop member provided on each thread separating spindle, a thread remover arranged between said two spindles and adapted to transport one thread after the other beyond the stop members on said spindles, a thread feeder to which every single removed thread is presented, a guide member for acting on the thread displaced by the movement of the feeder, an eyelet for receiving the thread from said guide member, a member adapted to lay the thread on a threading needle, said eyelet being in the path of the thread laying member, a resilient buffer device cooperating with said thread laying member and taking part in part of the movement of the latter, and a guide lever controlled by said thread laying device and adapted to receive and hold the threading needle when the thread is laid upon it.

12. In a device of the type described, comprising in combination, means to hold the threads to be separated in a row, two rotatable thread separating spindles cooperating with the row of threads, a stop member provided on each thread separating spindle, a thread remover arranged between said two spindles and adapted to transport one thread after the other beyond the stop members on said spindles, a thread feeder to which every single removed thread is presented, a guide member for acting on the thread displaced by the movement of the feeder, an eyelet for receiving the thread from said guide member, a member adapted to lay the thread on a threading needle, said eyelet being in the path of the thread laying member, a resilient buffer device cooperating with said thread laying member and taking part in part of the movement of the latter, a guide lever controlled by said thread laying device and adapted to receive and hold the threading needle when the thread is laid upon it, a bell crank lever and a supporting lever cooperating with said guide lever, and rods for controlling the movement of said levers.

13. In a device of the type described, comprising in combination, means to hold the threads to be separated in a row, two rotatable thread separating spindles cooperating with said row of threads for moving the latter along the spindles, a stop member provided on every thread separating spindle, a thread remover arranged between said two spindles and provided with a bunch of bristles for sweeping engagement with said threads, means adapted to impart to said thread remover a movement transverse to said threads for transporting one thread after the other beyond the stop members on said spindles, a thread feeder to which every single removed thread is presented, a clamping device for holding the thread removed by the thread remover, and an automatic cutting device for serving the thread thus held.

In testimony whereof I have signed my name to this specification.

WILLIBALD HAMMER.